US011887745B2

(12) United States Patent
Gaehle

(10) Patent No.: US 11,887,745 B2
(45) Date of Patent: Jan. 30, 2024

(54) METHODS FOR PRODUCING RADIONUCLIDES USING MINIMAL TARGETING MATERIAL

(71) Applicant: Gregory Gaehle, St. Louis, MO (US)

(72) Inventor: Gregory Gaehle, St. Louis, MO (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 17/960,279

(22) Filed: Oct. 5, 2022

(65) Prior Publication Data

US 2023/0109146 A1 Apr. 6, 2023

Related U.S. Application Data

(62) Division of application No. 16/352,516, filed on Mar. 13, 2019, now Pat. No. 11,495,365.

(60) Provisional application No. 62/642,418, filed on Mar. 13, 2018.

(51) Int. Cl.
*G21G 1/10* (2006.01)
*H05H 6/00* (2006.01)
*G21K 5/08* (2006.01)
*G21G 1/00* (2006.01)

(52) U.S. Cl.
CPC ................ *G21G 1/10* (2013.01); *G21K 5/08* (2013.01); *H05H 6/00* (2013.01); *G21G 2001/0094* (2013.01)

(58) Field of Classification Search
CPC .... G21G 1/10; G21G 2001/0094; G21K 5/08; H05H 6/00
USPC ....................... 376/194, 195, 202; 250/492.3
See application file for complete search history.

(56) References Cited

U.S. PATENT DOCUMENTS 6,011,825 A * 1/2000 Welch ..................... G21G 1/10
376/195

OTHER PUBLICATIONS

Ohya, "Efficient preparation of high-quality 64Cu for routine use", Nuclear Medicine and Biology, vol. 43, No. 11, pp. 685-691 (2016). (Year: 2016).*
Lapi, "Cyclotron production of positron emitting radiometals", Proceedings of PAC2013, pp. 1122-1124 (2013). (Year: 2013).*
Le, "Alternative method for 64Cu radioisotope production", Applied Radiation and Isotopes, vol. 67, No. 7-8, pp. 1324-1331 (2009). (Year: 2009).*

* cited by examiner

*Primary Examiner* — Jack W Keith
*Assistant Examiner* — Daniel Wasil

(57) ABSTRACT

Among the various aspects of the present disclosure is the provision of methods for producing radioisotopes and improving the specific activity of radioisotopes (e.g., Cu-64 chloride). As described herein, the method includes matching of the target material and the proton beam strike area, resulting in improved specific activity while reducing the amount of target material used.

18 Claims, 6 Drawing Sheets

Mounting Flange

METHODS FOR PRODUCING RADIONUCLIDES USING MINIMAL TARGETING MATERIAL

CROSS-REFERENCE TO RELATED APPLICATIONS

This application is a divisional of U.S. patent application Ser. No. 16/352,516 filed 13 Mar. 2019, which claims priority from U.S. Provisional Application Ser. No. 62/642,418 filed on 13 Mar. 2018, which are incorporated herein by reference in their entireties.

STATEMENT REGARDING FEDERALLY SPONSORED RESEARCH OR DEVELOPMENT

This invention was made with government support under CA086307 awarded by the National Institutes of Health and DE-FG02-87EF60512 awarded by the Department of Energy. The government has certain rights in the invention.

MATERIAL INCORPORATED-BY-REFERENCE

Not applicable.

FIELD OF THE INVENTION

The present disclosure generally relates to methods of making radionuclides (e.g., Cu-64).

SUMMARY OF THE INVENTION

Among the various aspects of the present disclosure is the provision of methods for producing radionuclides (e.g., Cu-64).

An aspect of the present disclosure provides for a method for manufacturing a radioisotope with improved specific activity comprising: providing a target material comprising a Ni isotope; providing a target material holder; providing a proton beam comprising a proton beam energy, a proton beam strike area, or a proton beam strike shape; or introducing the proton beam to the target material, resulting in a composition comprising a Cu radioisotope.

In some embodiments, the target material comprises a target material area or target material shape; or the target material area or the target material shape matches the proton beam strike area or the proton beam strike shape, resulting in matching of the target material and the proton beam strike area or the proton beam strike shape.

In some embodiments, the method comprises degrading or reducing the proton beam energy to below about 14.5 meV and focusing or constraining the proton beam.

In some embodiments, the target material comprises Ni-64; the target material has a weight of about 80 mg or less; the target material area is about 20 $mm^2$ or less; the proton beam strike shape or the target material shape is not a circle; the proton beam strike shape or the target material shape is asymmetric; or the proton beam strike shape or the target material shape is approximately an oval shape.

In some embodiments, the proton beam strike shape or the proton beam strike area is constrained to match the target material or the target material is modified to match the proton beam strike shape or the proton beam strike area.

In some embodiments, the target material is mounted to the target material holder via an insulator.

In some embodiments, the target material comprises gold or platinum.

In some embodiments, the target material is keyed to orient the target material with the proton beam strike area, resulting in a keyed target material.

In some embodiments, the target material holder is designed to accept a keyed target material; or the target material holder orients the target material in the proton beam strike area of the proton beam.

In some embodiments, the target material holder provides cooling or dissipates heat produced by the proton beam.

In some embodiments, the target material holder provides cooling water and removes the cooling water.

In some embodiments, the target material holder provides front and back face cooling of the target material.

In some embodiments, the cooling water is deionized, having a resistivity of about 7.5 MΩ or greater than about 7.5 MΩ, preventing or reducing radioisotope contamination of the cooling water.

In some embodiments, the method further comprises measuring the proton beam current of the target material via a target material holder mounting flange; or recovering the target material.

In some embodiments, a reduced amount of the target material is required to produce Cu-64 in high yield of at least about 7.5 Ci at saturation compared to an amount of the target material required if the proton beam strike area or the proton beam strike shape does not match the target material area or the target material shape.

In some embodiments, the Cu radioisotope has an activity of at least about 150 mCi/μA.

In some embodiments, the Cu radioisotope has a specific activity of at least about 200 mCi/μg, at least about 250 mCi/μg, or at least about 300 mCi/μg.

In some embodiments, the method further comprises contacting the composition comprising the Cu radioisotope with an acid.

In some embodiments, the acid is hydrochloric acid (HCl).

In some embodiments, the composition comprising the Cu radioisotope is a mixture comprising the Ni isotope and the Cu radioisotope.

In some embodiments, the method further comprises separating the Ni radioisotope and Cu radioisotope using liquid chromatography.

Other objects and features will be in part apparent and in part pointed out hereinafter.

DESCRIPTION OF THE DRAWINGS

Those of skill in the art will understand that the drawings, described below, are for illustrative purposes only. The drawings are not intended to limit the scope of the present teachings in any way.

FIG. 1B is an alternative view of FIG. 1A showing a close up of the left side of Cu-64 module not seen in FIG. 1A because of the delivery station cover. FIG. 1C is a close up of the dissolution vessel (PTFE) inserted into the heating and cooling block sealed with a PTFE gate valve. FIG. 1D shows the dissolution vessel being removed from heating cooling block.

DETAILED DESCRIPTION OF THE INVENTION

Figure 1A:
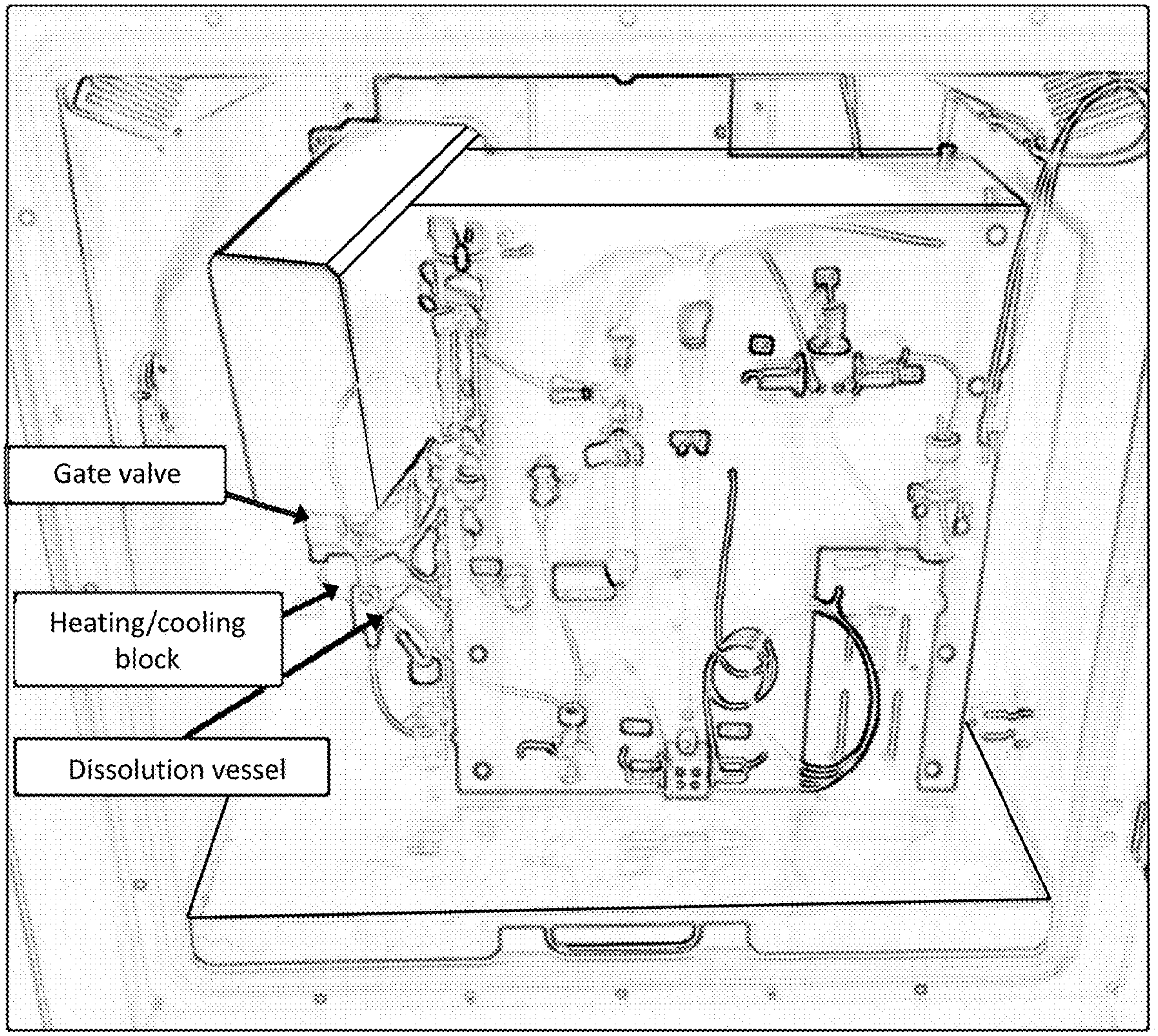
FIG. 1A-FIG. 1D is a series of images depicting a Cu-64 separation module.
Figure 1B:
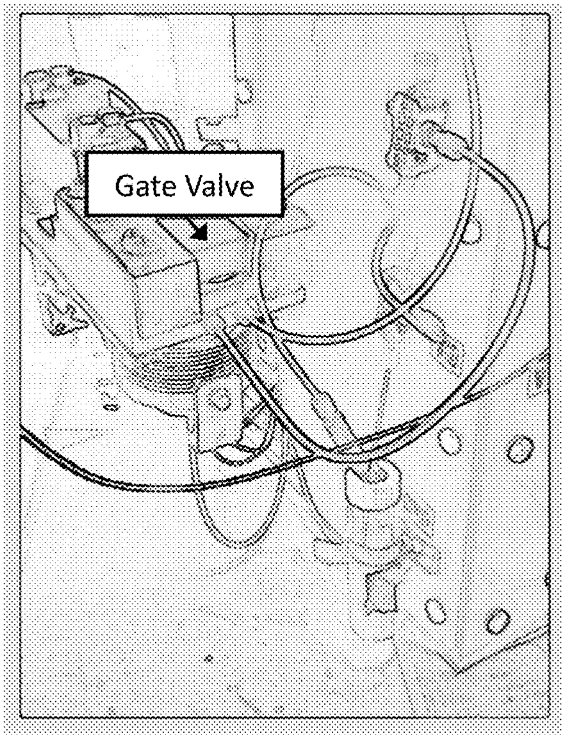
Figure 1C:
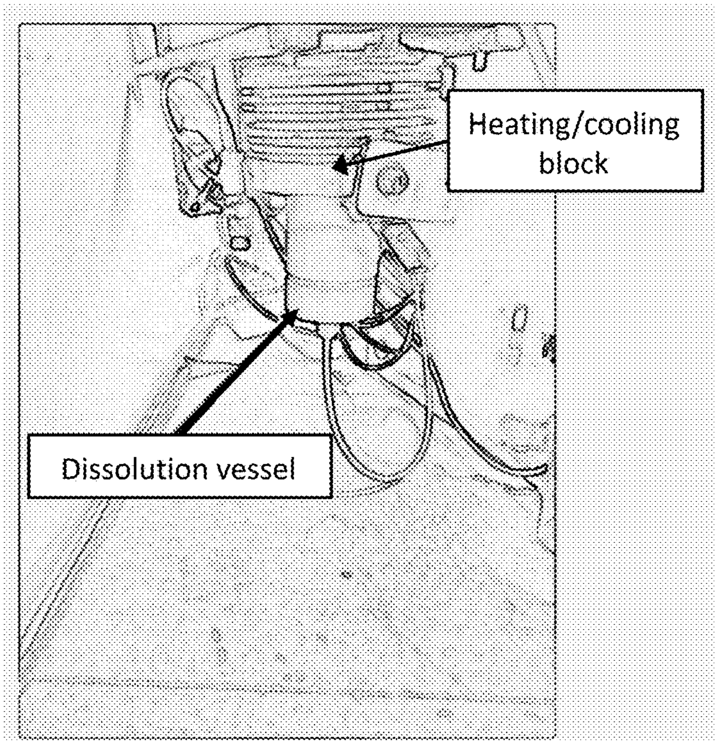
Figure 1D:
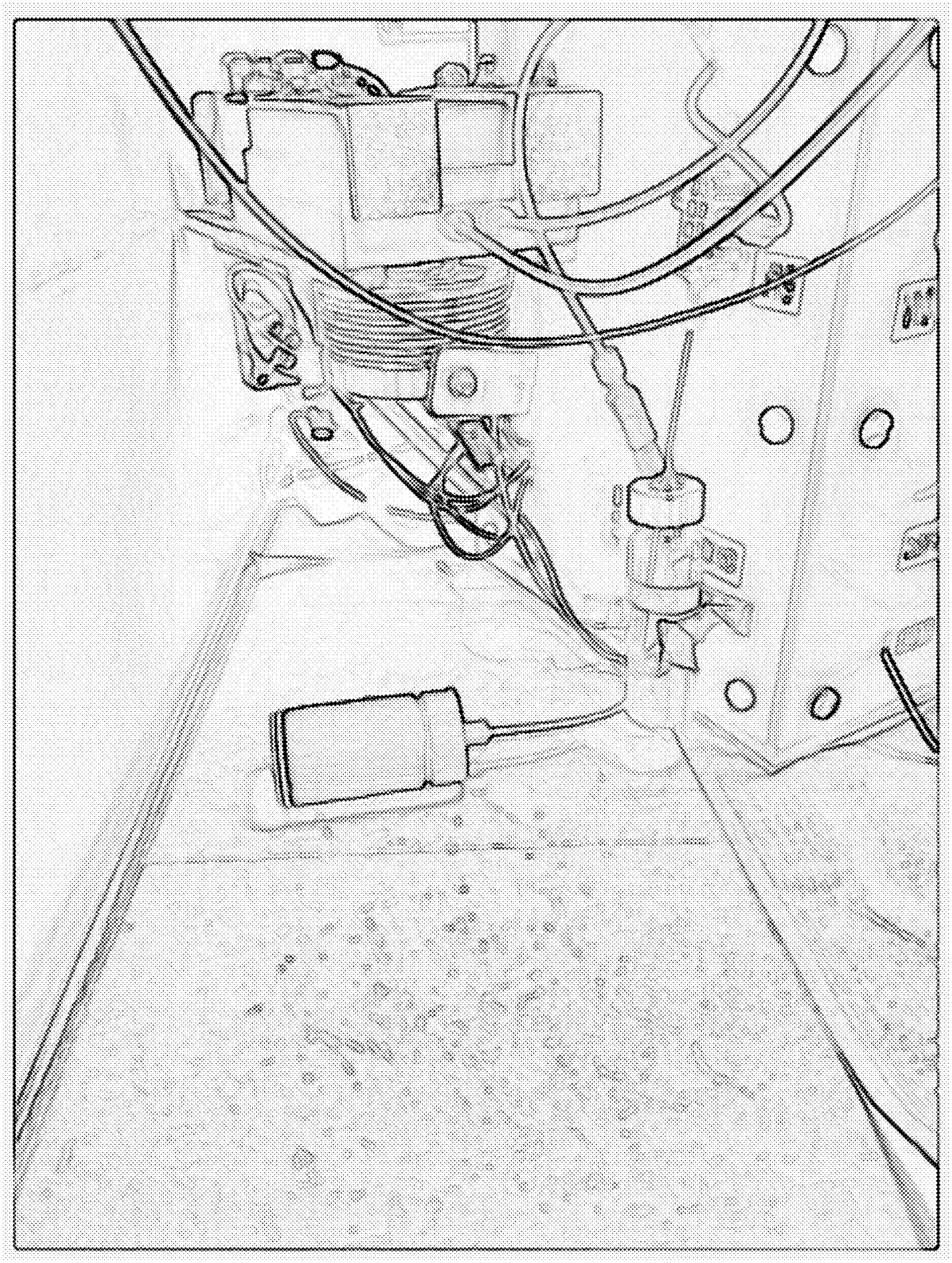
Figure 2:
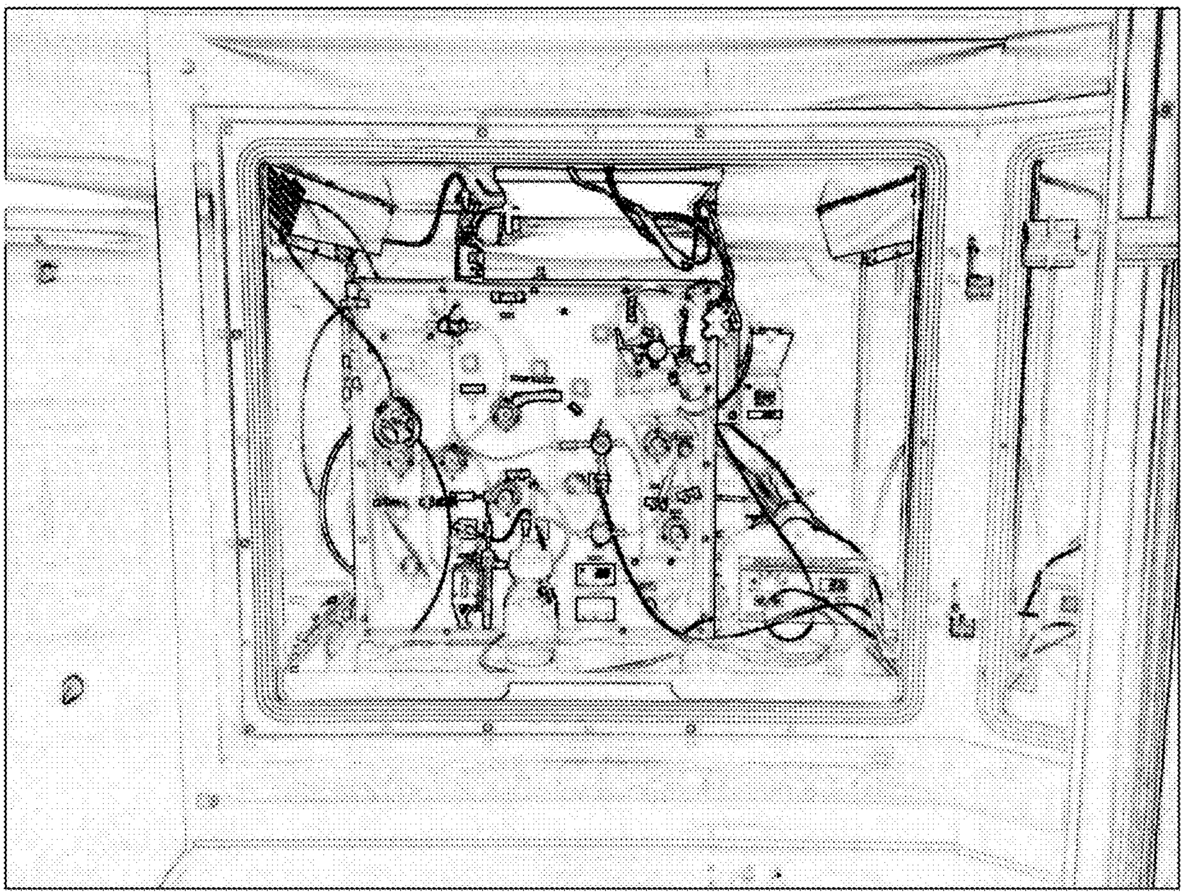
FIG. 2 is an image of an automation system using a platform that proved reliable under extensive use for F-18 and C-11.

The present disclosure is based, at least in part, on the discovery that specific preparation and processing systems reliably manufacture Cu-64 chloride having an improved specific activity (e.g., about 200 mCi/μg or more or 250 mCi/μg) compared to previous methods. As shown herein, the enhanced specific activity was achieved using a proton particle accelerator and the Washington University designed target preparation and processing systems. The manufacturing process focused on critical steps to achieving high yield and specific activity Cu-64 chloride using specialized automation designed and built at Washington University.

Although the concept of an optimal target material thickness to beam impingement area has been previously described, reducing the beam impingement area and limiting the area of the target material to achieve optimal thickness with less target material has not been discovered.

The methods and systems as described herein routinely manufacture Cu-64 chloride with high specific activity and radionuclidic purity. Due to the enhanced properties, more doses can be prepared and shipped in one vial compared to other radionuclides.

Cu-64 is a desirable radioisotope for its half-life and decay properties that provide unique imaging characteristics as demonstrated by the commercial success of the disclosed product. This includes multiple pharmaceutical companies seeking a reliable supply of high quality Cu-64 for their proprietary Cu-64 radiopharmaceuticals.

The disclosed methods are improvements on known processes for manufacturing radionuclides (e.g., Cu-64) at increased yields and increased specific activities. Processes for the manufacture of Cu-64 are well known; see e.g. U.S. patent application Ser. No. 10/914,617, incorporated by reference in its entirety). Except as otherwise noted herein, therefore, the process of the present disclosure can be carried out in accordance with such processes.

Improved Cu-64 Manufacturing System and Process

The present disclosure provides for a system and optimized steps for improving the yield of high specific activity Cu-64 (see e.g., Example 1). For example, the method or system can comprise electroplating a Ni-64 target (thicker than conventional techniques); constraining a beam to optimize interaction with the target (e.g., measuring the beam shape and optimizing target shape to match the beam shape or constraining the beam shape to match the target); providing a dedicated deionized water cooling system for the target holder; Teflon™ coated vessels/connectors to allow for hands-free manipulation/separation of the Ni and Cu in 6 N HCl conditions; and/or a vacuum and syringe that drives enhanced reproducibility.

Previous systems used a flat bottom digestion reactor made of Teflon™ directly heated with heat cartridges. The flat bottom and small diameter of the digestion vessel, that was just slightly larger than the target holder, required the irradiated target to be position face up to fully dissolve the Ni-64 containing Cu-64 from the gold disk target holder. This problem significantly increased the hand doses to personnel using the module. Additionally, the flat bottom digestion vessel coupled with the diameter contributed to the fluid pathway intermittently becoming blocked by the gold disk resulting in numerous failed process. The water cooled reflux condenser was too large to allow automatic dropping of the target in a standard hot cells. Additionally, the reflux condenser using room temperature water also failed to fully contain the 6 N HCl as indicated by rapid corrosion of the automation system. The rotatory pinch valves, designed to increase longevity of the tubing used for the fluid pathways were unreliable, and resulted in unacceptable leakage of chemicals used in the process and intermittently led to large dead volumes. The pinch valves also had stainless steel heads and bearing that corroded rapidly leading to a significant amount of failures and possible contamination of the Cu-64 chloride with iron. The flaws of this system prohibited it from producing high quality Cu-64 reliably and required the cyclotron facility to rely on manual techniques to manufacture Cu-64 and Cu-60 while developing another version of the module.

A system was designed to address the flaws of the previous system by replacing the rotatory pinch valves with air actuated pinch valves having plastic and aluminum parts to insure they were more acid resistant. This reduced the potential of metal contamination from corroding valves having metals exposed to the processing area that were not acid resistant. The layout was optimized to reduce dead volumes and facilitate the flow of chemicals. The flat bottom digestion reactor made of Teflon™ directly heated with heat cartridges was modified to have a conical bottom that in bench top testing was an improvement but not 100% reliable. During bench top testing of this module it was decided to construct the next generation of automation using acid resistant plastics. In a version it was attempted to reduce the size of the column that contained the ion exchange resin and found that to be detrimental to the process. As a result of the difficulties with the previous designs, the cyclotron facility used effective manual remote method to process Cu-64 to produce acceptable specific activity Cu-64 chloride.

The present Cu-64 separation module design corrected problems encountered with previous versions and was optimized to address issues experienced using the manual remote system. The present design uses vacuum, inert gas pressure with flow control and syringe drives to effect the flow of chemicals through the system. This is believed to be the first system to use all of the above methods for moving liquids through the automation system. While a single method could be used to effect movement of liquids, using all three for specific tasks have enabled improvement of reliability and % radiochemical yields.

As described above, the digestion vessel was modified to improve reliability and eliminate the need to orient the target holder for optimal dissolution of the Ni-64 containing Cu-64 from the gold disk (target material substrate). The condenser intended to contain the HCl during heating was removed in favor of an in-house developed Teflon™ gate valve that allows the generation of pressure within the digestion vessel. This was shown to be more effective at containing the HCl acid vapor than the water-cooled reflux condenser that increases the difficulty of installing the module in a hot cell and requires an additional chilled water system.

Instead of heating the Teflon™ digestion vessel directly with heat cartridges the digestion vessel is contained in aluminum housing that is heated and has cooling fin to allow for rapid cooling of the digestion vessel and contents. This allows the contents of the digestion vessel to be moved to an ion exchange column with shorter cool down periods. Additionally the bottom is conical, having a Teflon™ spacer added to the vessel to eliminate the need to orient the target and prevents blockage of the fluid pathway by the gold disk substrate. The flow pathways were optimized for precise fluid flow and easy replacement of chemical traps intended to contain acid vapor and Cu-64 in the unlikely event it aerosolized. Appropriate cleaning of the automated separation module was simplified with dedicated fluid pathways and were shown to be more effective at maintaining high specific activity of the product than disposable tubing, which is believed to be the result of small dead volume using non-disposable fluid pathways versus disposable.

The digestion vessel was designed to allow for automatic delivery of the target from the cyclotron using dedicated carriers transported from the cyclotron to the hot cell using vacuum. Once in the hot cell, the carrier is automatically opened to drop the target in the digestion vessel that is then closed by the gate valve. The carrier is then returned to the cyclotron vault when needed to automatically collect the next Cu-64 target. The module drop also allows the target to be added by dropping into the digestion station from a shielded carrier.

Using the disclosed process, including targetry and separation technology, high specific activity and high purity Cu-64 can be reliably produced that is suitable for radiochemistry and human use.

Target Material and Target Material Substrate

The system and methods described herein disclose a target material, a target material holder, a proton beam having a proton beam strike area or proton beam strike shape. The target material can be electroplated onto a substrate (e.g., a gold or metal plate) wherein the target material and substrate match or are approximately the same size, shape, and/or area as the proton beam strike size, shape, and/or area.

As described herein, the target material (e.g., Ni-64) can be electroplated onto a substrate at about 100 mg or less of target material. For example, the target material can weigh between about 1 mg and about 200 mg. As another example, the target material can weigh about 1 mg; about 2 mg; about 3 mg; about 4 mg; about 5 mg; about 6 mg; about 7 mg; about 8 mg; about 9 mg; about 10 mg; about 11 mg; about 12 mg; about 13 mg; about 14 mg; about 15 mg; about 16 mg; about 17 mg; about 18 mg; about 19 mg; about 20 mg; about 21 mg; about 22 mg; about 23 mg; about 24 mg; about 25 mg; about 26 mg; about 27 mg; about 28 mg; about 29 mg; about 30 mg; about 31 mg; about 32 mg; about 33 mg; about 34 mg; about 35 mg; about 36 mg; about 37 mg; about 38 mg; about 39 mg; about 40 mg; about 41 mg; about 42 mg; about 43 mg; about 44 mg; about 45 mg; about 46 mg; about 47 mg; about 48 mg; about 49 mg; about 50 mg; about 51 mg; about 52 mg; about 53 mg; about 54 mg; about 55 mg; about 56 mg; about 57 mg; about 58 mg; about 59 mg; about 60 mg; about 61 mg; about 62 mg; about 63 mg; about 64 mg; about 65 mg; about 66 mg; about 67 mg; about 68 mg; about 69 mg; about 70 mg; about 71 mg; about 72 mg; about 73 mg; about 74 mg; about 75 mg; about 76 mg; about 77 mg; about 78 mg; about 79 mg; about 80 mg; about 81 mg; about 82 mg; about 83 mg; about 84 mg; about 85 mg; about 86 mg; about 87 mg; about 88 mg; about 89 mg; about 90 mg; about 91 mg; about 92 mg; about 93 mg; about 94 mg; about 95 mg; about 96 mg; about 97 mg; about 98 mg; about 99 mg; about 100 mg; about 101 mg; about 102 mg; about 103 mg; about 104 mg; about 105 mg; about 106 mg; about 107 mg; about 108 mg; about 109 mg; about 110 mg; about 111 mg; about 112 mg; about 113 mg; about 114 mg; about 115 mg; about 116 mg; about 117 mg; about 118 mg; about 119 mg; about 120 mg; about 121 mg; about 122 mg; about 123 mg; about 124 mg; about 125 mg; about 126 mg; about 127 mg; about 128 mg; about 129 mg; about 130 mg; about 131 mg; about 132 mg; about 133 mg; about 134 mg; about 135 mg; about 136 mg; about 137 mg; about 138 mg; about 139 mg; about 140 mg; about 141 mg; about 142 mg; about 143 mg; about 144 mg; about 145 mg; about 146 mg; about 147 mg; about 148 mg; about 149 mg; about 150 mg; about 151 mg; about 152 mg; about 153 mg; about 154 mg; about 155 mg; about 156 mg; about 157 mg; about 158 mg; about 159 mg; about 160 mg; about 161 mg; about 162 mg; about 163 mg; about 164 mg; about 165 mg; about 166 mg; about 167 mg; about 168 mg; about 169 mg; about 170 mg; about 171 mg; about 172 mg; about 173 mg; about 174 mg; about 175 mg; about 176 mg; about 177 mg; about 178 mg; about 179 mg; about 180 mg; about 181 mg; about 182 mg; about 183 mg; about 184 mg; about 185 mg; about 186 mg; about 187 mg; about 188 mg; about 189 mg; about 190 mg; about 191 mg; about 192 mg; about 193 mg; about 194 mg; about 195 mg; about 196 mg; about 197 mg; about 198 mg; about 199 mg; or about 200 mg. Recitation of each of these discrete values is understood to include ranges between each value. Recitation of each range is understood to include discrete values within the range.

As described herein, the target material can be plated on a substrate or insulator having a plating area. The plating area can be about 20 $mm^2$ or less. For example, the plating area can be between about 1 $mm^2$ and about 40 $mm^2$. As an example, the plating area can be about 1 $mm^2$; about 2 $mm^2$; about 3 $mm^2$; about 4 $mm^2$; about 5 $mm^2$; about 6 $mm^2$; about 7 $mm^2$; about 8 $mm^2$; about 9 $mm^2$; about 10 $mm^2$; about 11 $mm^2$; about 12 $mm^2$; about 13 $mm^2$; about 14 $mm^2$; about 15 $mm^2$; about 16 $mm^2$; about 17 $mm^2$; about 18 $mm^2$; about 19 $mm^2$; about 20 $mm^2$; about 21 $mm^2$; about 22 $mm^2$; about 23 $mm^2$; about 24 $mm^2$; about 25 $mm^2$; about 26 $mm^2$; about 27 $mm^2$; about 28 $mm^2$; about 29 $mm^2$; about 30 $mm^2$; about 31 $mm^2$; about 32 $mm^2$; about 33 $mm^2$; about 34 $mm^2$; about 35 $mm^2$; about 36 $mm^2$; about 37 $mm^2$; about 38 $mm^2$; about 39 $mm^2$; or about 40 $mm^2$. Recitation of each of these discrete values is understood to include ranges between each value. Recitation of each range is understood to include discrete values within the range.

As described herein, the plating or substrate diameter can be about 5 mm or less. For example, the plating or substrate diameter can be between about 0.1 mm and about 10 mm. As an example, the plating or substrate diameter can be about 0.1 mm; 0.2 mm; about 0.3 mm; about 0.4 mm; about 0.5 mm; about 0.6 mm; about 0.7 mm; about 0.8 mm; about 0.9 mm; about 1 mm; about 1.1 mm; about 1.2 mm; about 1.3 mm; about 1.4 mm; about 1.5 mm; about 1.6 mm; about 1.7 mm, about 1.8 mm, about 1.9 mm, about 2 mm; about 2.1 mm; about 2.2 mm, about 2.3 mm; about 2.4 mm; about 2.5 mm; about 2.6 mm; about 2.7 mm; about 2.8 mm; about 2.9 mm; about 3 mm; about 3.1 mm; about 3.2 mm; about 3.3 mm; about 3.4 mm; about 3.5 mm; about 3.6 mm; about 3.7 mm; about 3.8 mm; about 3.9 mm; about 4 mm; about 4.1 mm; about 4.2 mm; about 4.3 mm; about 4.4 mm; about 4.5 mm; about 4.6 mm; about 4.7 mm; about 4.8 mm; about 4.9 mm; about 5 mm; about 5.1 mm; about 5.2 mm; about 5.3 mm; about 5.4 mm; about 5.5 mm; about 5.6 mm; about 5.7 mm; about 5.8 mm; about 5.9 mm; about 6 mm; about 6.1 mm; about 6.2 mm; about 6.3 mm; about 6.4 mm; about 6.5 mm; about 6.6 mm; about 6.7 mm; about 6.8 mm; about 6.9 mm; about 7 mm; about 7.1 mm; about 7.2 mm; about 7.3 mm; about 7.4 mm; about 7.5 mm; about 7.6 mm; about 7.7 mm; about 7.8 mm; about 7.9 mm; about 8 mm; about 8.1 mm; about 8.2 mm; about 8.3 mm; about 8.4 mm; about 8.5 mm; about 8.6 mm; about 8.7 mm; about 8.8 mm; about 8.9 mm; about 9 mm; about 9.1 mm; about 9.2 mm; about 9.3 mm; about 9.4 mm; about 9.5 mm; about 9.6 mm; about 9.7 mm; about 9.8 mm; about 9.9 mm; or about 10 mm. Recitation of each of these discrete values is understood to include ranges between each value. Recitation of each range is understood to include discrete values within the range.

As described herein, the method provides for a thicker target and a reduction in target material. Compared to conventional methods, the plating area for the target material can be reduced by 20% and the target thickness can be increased by about 25%. This reduces the amount of material needed to produce a thick target material. The target material can have a thickness between about 1 μm and about 2,000 μm (2 mm). For example, the target material can have a thickness of about 1 μm; about 10 μm; about 20 μm; about 30 μm; about 40 μm; about 50 μm; about 60 μm; about 70 μm; about 80 μm; about 90 μm; about 100 μm; about 110 μm; about 120 μm; about 130 μm; about 140 μm; about 150 μm; about 160 μm; about 170 μm; about 180 μm; about 190 μm; about 200 μm; about 210 μm; about 220 μm; about 230 μm; about 240 μm; about 250 μm; about 260 μm; about 270 μm; about 280 μm; about 290 μm; about 300 μm; about 310 μm; about 320 μm; about 330 μm; about 340 μm; about 350 μm; about 360 μm; about 370 μm; about 380 μm; about 390 μm; about 400 μm; about 410 μm; about 420 μm; about 430 μm; about 440 μm; about 450 μm; about 460 μm; about 470 μm; about 480 μm; about 490 μm; about 500 μm; about 510 μm; about 520 μm; about 530 μm; about 540 μm; about 550 μm; about 560 μm; about 570 μm; about 580 μm; about 590 μm; about 600 μm; about 610 μm; about 620 μm; about 630 μm; about 640 μm; about 650 μm; about 660 μm; about 670 μm; about 680 μm; about 690 μm; about 700 μm; about 710 μm; about 720 μm; about 730 μm; about 740 μm; about 750 μm; about 760 μm; about 770 μm; about 780 μm; about 790 μm; about 800 μm; about 810 μm; about 820 μm; about 830 μm; about 840 μm; about 850 μm; about 860 μm; about 870 μm; about 880 μm; about 890 μm; about 900 μm; about 910 μm; about 920 μm; about 930 μm; about 940 μm; about 950 μm; about 960 μm; about 970 μm; about 980 μm; about 990 μm; about 1000 μm; about 1010 μm; about 1020 μm; about 1030 μm; about 1040 μm; about 1050 μm; about 1060 μm; about 1070 μm; about 1080 μm; about 1090 μm; about 1100 μm; about 1110 μm; about 1120 μm; about 1130 μm; about 1140 μm; about 1150 μm; about 1160 μm; about 1170 μm; about 1180 μm; about 1190 μm; about 1200 μm; about 1210 μm; about 1220 μm; about 1230 μm; about 1240 μm; about 1250 μm; about 1260 μm; about 1270 μm; about 1280 μm; about 1290 μm; about 1300 μm; about 1310 μm; about 1320 μm; about 1330 μm; about 1340 μm; about 1350 μm; about 1360 μm; about 1370 μm; about 1380 μm; about 1390 μm; about 1400 μm; about 1410 μm; about 1420 μm; about 1430 μm; about 1440 μm; about 1450 μm; about 1460 μm; about 1470 μm; about 1480 μm; about 1490 μm; about 1500 μm; about 1510 μm; about 1520 μm; about 1530 μm; about 1540 μm; about 1550 μm; about 1560 μm; about 1570 μm; about 1580 μm; about 1590 μm; about 1600 μm; about 1610 μm; about 1620 μm; about 1630 μm; about 1640 μm; about 1650 μm; about 1660 μm; about 1670 μm; about 1680 μm; about 1690 μm; about 1700 μm; about 1710 μm; about 1720 μm; about 1730 μm; about 1740 μm; about 1750 μm; about 1760 μm; about 1770 μm; about 1780 μm; about 1790 μm; about 1800 μm; about 1810 μm; about 1820 μm; about 1830 μm; about 1840 μm; about 1850 μm; about 1860 μm; about 1870 μm; about 1880 μm; about 1890 μm; about 1900 μm; about 1910 μm; about 1920 μm; about 1930 μm; about 1940 μm; about 1950 μm; about 1960 μm; about 1970 μm; about 1980 μm; about 1990 μm; or about 20000 μm. Recitation of each of these discrete values is understood to include ranges between each value. Recitation of each range is understood to include discrete values within the range.

Isolation and Recovery of Radioisotopes of Copper

Radioactive $^{60}$Cu, $^{61}$Cu, and $^{64}$Cu can be isolated and recovered as purified products of this discovery for further use in a radiolabel tracer compound.

Each of the respective copper radionuclides (60, 61, and 64) can be produced from a different but respective enriched Ni target material for example: $^{60}$Cu is produced from $^{60}$Ni via the nuclear reaction $^{60}$Ni(p,n)$^{60}$Cu, $^{61}$Cu is produced from $^{61}$Ni via the nuclear reaction $^{61}$Ni(p,n)$^{61}$Cu and $^{64}$Cu is produced from $^{64}$Ni via the nuclear reaction $^{64}$Ni(p,n)$^{64}$Cu. In some embodiments, $^{61}$Cu is also produced by the $^{62}$Ni[d,n]$^{61}$Cu nuclear reaction.

In some embodiments, the system can comprise two stand alone unit(s) in an automated system which can be operated together. In an embodiment, a first stand alone unit can be a functional automated copper radionuclide separation and purification process. In another embodiment, a second stand alone unit can be a functional automated copper radionuclide labeling process. In another embodiment, radioactive $^{60}$Cu, $^{61}$Cu, or $^{64}$Cu can be isolated and recovered as purified products of this discovery for further use in a radiolabel tracer compound. In another embodiment, the automated system can be electrically/pneumatically/communicatively configured, capable and functional in all operationally necessary embodiments.

The process for enhancing the specific activity, yield, and purity can comprise processes for separating, purifying, and recovering radionuclides from a multi-component composition and labeling individual radionuclides. In some embodiments, the disclosed method utilizes liquid chromatography to selectively separate Nickel-60 from a mixture of Copper-60 and Nickel-60; selectively separate Nickel-61 from a mixture of Copper-61 and Nickel-61; or to selectively separate Nickel-64 from a mixture of Copper-64 and Nickel-64. Copper-64 can be useful in clinical, major medical treatment, and/or research facilities as it can be distributed to multiple sites and as a radionuclide for pharmaceutical.

The term "chromatography" can include techniques involving mass-transfer between one or more stationary phases and one or more mobile phases such as typically carried out in a chromatographic separation zone. The term "chromatography" can include any useful form that uses a column or tube or container having an internal lumen to satisfactorily hold a stationary phase. Useful illustrative chromatographic techniques include open column chromatography, HPLC, or open tubular capillary chromatography. In some embodiments, Liquid Chromatography (LC) can be utilized as a mode of chromatography on a multi component feed composition containing a precursor nuclide of nickel and a nickel bombardment product being a radionuclide of copper.

In separating radionuclides, LC utilizes a liquid mobile phase to successfully effectively separate the components of a mixture, such as a mixture of Copper-64 and Nickel-64. The Nickel-64 and Copper-64 components (or analytes) (or Nickel-60 in Copper-60 or Nickel 61 in Copper-61) can be dissolved in a solvent, and fed to a chromatographic column under atmospheric pressure or gravity. In the column, the mixture is resolved into its components. In some embodiments, the stationary phase is immobile packing material in the column. In some embodiments, the immobile packing material is held in place by an appropriate packing support in the lumen of the column. In some embodiments, the immobile packing material can be purchased as a part of the column or added to the lumen of the chromatographic column prior to loading of the components to be separated. The pressure in the column is generally atmospheric pressure in the range from about 1 to about 2 atmospheres (14.7 to 29.4 psi respectively). In some embodiments, the column is a vented column and elution is by gravity. In some embodiments, the column can be pressurized up to about 2.5 atm (35 psi) without affecting its operability.

In some embodiments, the extraction process can use the ionic affinity of Nickel-60 or -61 or -64 to a solvent employed as a liquid mobile phase carrier to selectively remove the Nickel-60 or -61 or -64 from a liquid composition containing Nickel-60 or -61 or -64 and Copper-60 or -61 or -64, wherein the composition is loaded on a packing in a separation zone and the mobile phase carrier is passed there through.

In some embodiments, the term “stationary phase” refers to solid support such as packing including ion exchange resin contained within the lumen or interior of the chromatographic separation such as in a column over which or through which the mobile phase flows. The mobile phase may be continuous, semi-continuous, or batch.

In some embodiments, the composition containing Nickel-60 or -61 or -64 in Copper-60 or -61 or -64 is typically a liquid and can be injected into the mobile phase (HCl) of the chromatographic column through a coupled injector leak tight port. As the composition to be refined/purified flows with the mobile phase through the stationary phase in the chromatographic separation zone of the column, the components of that composition to be refined migrate to the stationary phase.

The main requisite for selection of a mobile phase herein is its capability to dissolve the composition containing the copper and nickel radionuclides at least up to a concentration suitable for the detection system coupled to the effluent of the column. This means that the column is selected to have the capability to provide the desired degree of refining/purification/extraction of the composition loaded onto the column so as to provide a refined Copper-60 or -61 or -64 radionuclide from a mixture of Copper-60 or -61 or -64 radionuclide and Nickel-60 or -61 or -64.

This inventive process comprises admixing a portion of a multi-component composition to be refined (i.e., having a Nickel-64 component desired to be purified) with a first mobile phase carrier to form a chromatographically separable multi-component separable composition comprising a first mobile phase carrier. The first mobile phase carrier has a high affinity for the Nickel-64 which is the material to be separated from the Copper-64. The chromatographically separable composition can be passed into a chromatographic separation zone having as packing therein ion exchange resins having an average particle diameter in the range from about 100 microns to about 200 microns. An eluent is thereby formed of a component (Nickel-64) of the multi-component composition. In some embodiments, the eluent is removed from the column and passed through an appropriate detector for analysis In some embodiments, the temperature of the chromatographic column can be in the range from about ambient temperature to about 60° C. or about 70° C. The initial addition of mobile phase carrier can be at about 98° C. and subsequent additions can be at about room temperature (about 25° C.).

In some embodiments, the eluent of the individual desired radionuclide (Copper-60, Copper-61, or Copper-64) is temporarily retained within the chromatographic system. A second mobile phase carrier having an affinity for the temporarily retained copper radionuclide is passed/loaded into the chromatographic separation zone following a first mobile phase carrier, thereby forming a purified eluent containing the component of interest in a purified or refined form.

In some embodiments, the column is a HCl (hydrochloric acid) acid attack resistant plastic or glass construction or a suitable rounded container and has leak-proof secure fittings at the ends of the column that connects the column to the injector at the loading end of the column and a detector at the effluent end. In some embodiments, the column has suitable internal configuration to hold the packing.

In some embodiments, the purified eluent comprising the purified copper radionuclide can be there after passed into a label process for appropriate labeling of the refined copper radionuclide with a ligand, if desired.

In some embodiments, (aqueous) HCl can be employed as a first mobile phase carrier. In some embodiments, the concentration of the HCl employed as a first mobile phase carrier to remove nickel radionuclide from the column is in the range from about 5 to about 7 and preferably from about 5.5 to about 6.5 molar. 6 M HCl is prepared from concentrated 12 M, ultra-pure 99.999999%, copper-free HCl and 18 Meg-ohm water. HCl (hydrochloric acid) also known as muriatic acid and chlorohydric acid is available commercially as an aqueous concentrate at about 12 M.

In some embodiments, (aqueous) HCl is employed as a second mobile phase carrier to remove the temporarily intentionally retained copper radionuclide from the column. The concentration of the HCl employed as a liquid, a second mobile phase carrier, is in the range from about 0.3 M to about 0.7 M and preferably from about 0.4 M to about 0.6 M. 0.5 M HCl is prepared from concentrated 12 M, ultra-pure 99.999999%, copper-free HCl and 18 Meg-ohm water.

Essentially, the first mobile phase carrier can be a high molarity aqueous hydrochloric acid composition and the second mobile phase carrier can be a low molarity aqueous hydrochloric acid composition.

In some embodiments, the second mobile phase carrier can be passed through the column after the passage of the first mobile phase carrier through the column. In some embodiments, both the first mobile phase carrier and second mobile phase carrier can be passed through the column in the same direction over column packing.

Typical materials of construction of the first chromatographic separation zone include acid resistant plastic or glass such as plastics and glass resistant to chemical attack by 6 N HCl (and above) and acid fumes or any suitable rounded container having a lumen therein.

In some embodiments, the removed eluent can be further processed for $^{60}$Ni, $^{61}$Ni, or $^{64}$Ni recovery recycling. In some embodiments, $^{60}$Cu, $^{61}$Cu, or $^{64}$Cu can be retained into the ion exchange column resin. The enriched nickel nuclide is eluted from the column and isolated for recycling purposes for the preparation on another target material. $^{60}$Cu, $^{61}$Cu, or $^{64}$Cu is subsequently recovered by addition of about 0.5 N HCl to elute purified $^{60}$Cu, $^{61}$Cu, or $^{64}$Cu for recovery and subsequently for labeling.

In one embodiment, the column can comprise a borosilicate (glass) Econo-column from Bio-Rad having catalog number 737-1031. Other sizes and material construction of columns can be employed for this application. In more detail the 737-1031 chromatographic column is 1.0×30 cm, 24 ml. About 4 cm of packing material is used in the column or 2.74 to 2.76 grams and preferably near 2.75 grams of packing material. Packing support which is understood to be a porous polymer bed support is manually packed in the column. In some embodiments, the column has translucent polypropylene end fittings (such as Luer-Lok) which allow visualization of the column bed. Another illustrative useful column is a jacketed Econo-Column which is another type of Econo-Column from Bio-Rad and which has an integral water jacket.

The term "chromatographic separation zone" is employed herein to mean any zone capable of effecting a separation of the components of a multi-component composition and includes useful chromatographic zones such as chromatographic columns of any useful shape, size, description or composition.

As used herein, the term "column" includes a plastic or glass high normality hydrochloric acid resistant tube or rounded container having a lumen therein with polished inner surface and fittings at both ends suitably configured for packing with small porous adsorbent particles as column packing therein.

The term "packing" is employed throughout this application and includes any ion exchange resin or any suitable retaining material employed in the internal volume of a chromatographic separation zone which is capable of retaining thereon a component of interest (copper radionuclide) releasable from the packing upon elution with an appropriately selected mobile phase carrier.

The term "multi-component composition" is employed throughout to mean a composition containing more than one component and includes compositions such as mixtures as well as true solutions.

As used herein, the term "preparation, synthesis, purification and recovery" to such a state/condition ready for use such as use as a radionuclide with a tracer compound for diagnostic imaging in animals.

In an embodiment, packing employed in a chromatographic separation zone in a first embodiment of this discovery has a particle size diameter in the range from about 30 to about 1000 microns and preferably from about 35 to about 400 microns.

The type of packing as retention support material which may be employed in the chromatographic separation zone and any second chromatographic separation zone is selected to retain a component of interest within a discreet zone of the packing which is releasable upon sequential elution with an appropriately selected mobile phase carrier after reading this specification. In some embodiments, the packing is selected to temporarily retain Copper-60, Copper-61, or Copper-64, which is sequentially and selectively releasable from such temporary retention by passing an appropriate mobile phase carrier over the packing containing the Copper-60, Copper-61, or Copper-64. Typical useful non-limiting packing includes polystyrene, divinyl benzene resin, or silica base packing.

In an embodiment, packing employed comprises Bio-Rad AG® 1-X8 Resin, 100-200 mesh chloride from catalog 140-1441, Bio-Rad Laboratories, 2000 Alfred Nobel Drive, Hercules, Calif. 84547. The resin is a styrene type—quaternary ammonium having a medium effective pore size with a Total Capacity of 2.6 meq/dry g, 1.2 meq/ml resin bed, Actual Wet Mesh Range of 80-140 (US Std) 106-180 microns, Moisture content of 39-48% by wt. and density (nominal) 0.75 gm/ml.

The term "mobile phase carrier" is employed throughout this application to include any composition capable of being passed into a chromatographic separation zone to effect the elution of a compound temporarily retained in the packing of a chromatographic separation zone. Typically the mobile phase carrier is a liquid or in liquid form at the time of being passed.

In some embodiments, the particular mobile phase carrier associated with first chromatographic separation zone corresponds with the type of packing employed in a first chromatographic separation zone.

Copper Radioisotopes

Described herein are methods and systems for producing Cu radioisotopes with increased yield, purity, and specific activity. As used herein, the term "detectably labeled" includes respective highly purified $^{60}$Cu, $^{61}$Cu, or $^{64}$Cu labeled compounds having an effective amount of an emitting copper radionuclide radiolabel therewith suitably accommodating for use in effective administration/therapy to living mammals. The longer half-life ($t_{1/2}$) of the copper radioisotopes allows for regional or national production.

A radionuclide can also be referred to as a radioactive nuclide, radioisotope, or radioactive isotope.

Imaging Agent

As described herein, the copper radionuclides can be used as an imaging agent in humans and animals.

In some embodiments, small animal imaging using copper radionuclides ($^{60}$Cu, $^{61}$Cu and $^{64}$Cu) can be performed on rodents (including mice and rats) following administration thereto of copper radiopharmaceuticals.

As used herein, the term "small animal" imaging includes imaging performed on cats, dogs, mice, rats and rodents. As used herein the term "rodent" includes members of the Order of Rodentia including squirrels, rats, prairie dogs, porcupines, mice, lemmings, marmots, guinea pigs, hamsters, gophers, gerbils, chipmunks, chinchillas, beaver, capybaras, porcupines, ground squirrels, or beaver.

Safety

In some embodiments, from a safety perspective, the process is monitored by using a suitable radiation detector and alerting system behind the column to monitor the activity displacement from the dissolution used to the recovery unit configured for, adapted to and affixed to the effluent process connection of the separation column.

Formulation

As described herein, the copper radionuclides can be formulated for use as an imaging agent or a therapeutic agent. For example, the copper radionuclides can be used as a PET imaging agent. As another example, the copper radionuclides can be used as a radiotherapeutic agent or radiopharmaceutical.

Conventionally, the term "purified $^{64}$Cu" has a—specific activity—in the range from about 20 mCi/μg to about 200 mCi/μg and preferably at least about 20 mCi/μg for use as an imaging agent and a higher specific activity ranging from about 150 mCi/μg to about 200 mCi/μg for use as a therapeutic agent.

As described herein, the disclosed improved process provides for a "purified $^{64}$Cu" having a specific activity in the range from at least about 200 mCi/μg to at least about 250 mCi/μg for use as an imaging agent or a therapeutic agent. For example, the $^{64}$Cu made according to the present disclosure can have a specific activity of about mCi/μg; about 13 mCi/μg; about 14 mCi/μg; about 15 mCi/μg; about 16 mCi/μg; about 17 mCi/μg; about 18 mCi/μg; about 19 mCi/μg; about 20 mCi/μg; about 21 mCi/μg; about 22 mCi/μg; about 23 mCi/μg; about 24 mCi/μg; about 25 mCi/μg; about 26 mCi/μg; about 27 mCi/μg; about 28 mCi/μg; about 29 mCi/μg; about 30 mCi/μg; about 31 mCi/μg; about 32 mCi/μg; about 33 mCi/μg; about 34 mCi/μg; about 35 mCi/μg; about 36 mCi/μg; about 37 mCi/μg; about 38 mCi/μg; about 39 mCi/μg; about 40 mCi/μg; about 41 mCi/μg; about 42 mCi/μg; about 43 mCi/μg; about 44 mCi/μg; about 45 mCi/μg; about 46 mCi/μg; about 47 mCi/μg; about 48 mCi/μg; about 49 mCi/μg; about 50 mCi/μg; about 51 mCi/μg; about 52 mCi/μg; about 53 mCi/μg; about 54 mCi/μg; about 55 mCi/μg; about 56 mCi/μg; about 57 mCi/μg; about 58 mCi/μg; about 59 mCi/μg; about 60 mCi/μg; about 61 mCi/μg; about 62 mCi/μg; about 63 mCi/μg; about 64 mCi/μg; about 65 mCi/μg; about 66 mCi/μg; about 67 mCi/μg; about 68 mCi/μg; about 69 mCi/μg; about 70 mCi/μg; about 71 mCi/μg; about 72 mCi/μg; about 73 mCi/μg; about 74 mCi/μg; about 75 mCi/μg; about 76 mCi/μg; about 77 mCi/μg; about 78 mCi/μg; about 79 mCi/μg; about 80 mCi/μg; about 81 mCi/μg; about 82 mCi/μg; about 83 mCi/μg; about 84 mCi/μg; about 85 mCi/μg; about 86 mCi/μg; about 87 mCi/μg; about 88 mCi/μg; about 89 mCi/μg; about 90 mCi/μg; about 91 mCi/μg; about 92 mCi/μg; about 93 mCi/μg; about 94 mCi/μg; about 95 mCi/μg; about 96 mCi/μg; about 97 mCi/μg; about 98 mCi/μg; about 99 mCi/μg; about 100 mCi/μg; about 101 mCi/μg; about 102 mCi/μg; about 103 mCi/μg; about 104 mCi/μg; about 105 mCi/μg; about 106 mCi/μg; about 107 mCi/μg; about 108 mCi/μg; about 109 mCi/μg; about 110 mCi/μg; about 111 mCi/μg; about 112 mCi/μg; about 113 mCi/μg; about 114 mCi/μg; about 115 mCi/μg; about 116 mCi/μg; about 117 mCi/μg; about 118 mCi/μg; about 119 mCi/μg; about 120 mCi/μg; about 121 mCi/μg; about 122 mCi/μg; about 123 mCi/μg; about 124 mCi/μg; about 125 mCi/μg; about 126 mCi/μg; about 127 mCi/μg; about 128 mCi/μg; about 129 mCi/μg; about 130 mCi/μg; about 131 mCi/μg; about 132 mCi/μg; about 133 mCi/μg; about 134 mCi/μg; about 135 mCi/μg; about 136 mCi/μg; about 137 mCi/μg; about 138 mCi/μg; about 139 mCi/μg; about 140 mCi/μg; about 141 mCi/μg; about 142 mCi/μg; about 143 mCi/μg; about 144 mCi/μg; about 145 mCi/μg; about 146 mCi/μg; about 147 mCi/μg; about 148 mCi/μg; about 149 mCi/μg; about 150 mCi/μg; about 151 mCi/μg; about 152 mCi/μg; about 153 mCi/μg; about 154 mCi/μg; about 155 mCi/μg; about 156 mCi/μg; about 157 mCi/μg; about 158 mCi/μg; about 159 mCi/μg; about 160 mCi/μg; about 161 mCi/μg; about 162 mCi/μg; about 163 mCi/μg; about 164 mCi/μg; about 165 mCi/μg; about 166 mCi/μg; about 167 mCi/μg; about 168 mCi/μg; about 169 mCi/μg; about 170 mCi/μg; about 171 mCi/μg; about 172 mCi/μg; about 173 mCi/μg; about 174 mCi/μg; about 175 mCi/μg; about 176 mCi/μg; about 177 mCi/μg; about 178 mCi/μg; about 179 mCi/μg; about 180 mCi/μg; about 181 mCi/μg; about 182 mCi/μg; about 183 mCi/μg; about 184 mCi/μg; about 185 mCi/μg; about 186 mCi/μg; about 187 mCi/μg; about 188 mCi/μg; about 189 mCi/μg; about 190 mCi/μg; about 191 mCi/μg; about 192 mCi/μg; about 193 mCi/μg; about 194 mCi/μg; about 195 mCi/μg; about 196 mCi/μg; about 197 mCi/μg; about 198 mCi/μg; about 199 mCi/μg; about 200 mCi/μg; about 201 mCi/μg; about 202 mCi/μg; about 203 mCi/μg; about 204 mCi/μg; about 205 mCi/μg; about 206 mCi/μg; about 207 mCi/μg; about 208 mCi/μg; about 209 mCi/μg; about 210 mCi/μg; about 211 mCi/μg; about 212 mCi/μg; about 213 mCi/μg; about 214 mCi/μg; about 215 mCi/μg; about 216 mCi/μg; about 217 mCi/μg; about 218 mCi/μg; about 219 mCi/μg; about 220 mCi/μg; about 221 mCi/μg; about 222 mCi/μg; about 223 mCi/μg; about 224 mCi/μg; about 225 mCi/μg; about 226 mCi/μg; about 227 mCi/μg; about 228 mCi/μg; about 229 mCi/μg; about 230 mCi/μg; about 231 mCi/μg; about 232 mCi/μg; about 233 mCi/μg; about 234 mCi/μg; about 235 mCi/μg; about 236 mCi/μg; about 237 mCi/μg; about 238 mCi/μg; about 239 mCi/μg; about 240 mCi/μg; about 241 mCi/μg; about 242 mCi/μg; about 243 mCi/μg; about 244 mCi/μg; about 245 mCi/μg; about 246 mCi/μg; about 247 mCi/μg; about 248 mCi/μg; about 249 mCi/μg; or about 250 mCi/μg. Recitation of each of these discrete values is understood to include ranges between each value. Recitation of each range is understood to include discrete values within the range.

As used herein, the expression "pharmaceutically acceptable" can apply to a composition comprising a compound or its copper radiolabeled counterpart herein, which contains composition ingredients that can be compatible with other ingredients of the composition as well as physiologically acceptable to the recipient, e.g., a mammal such as a human.

In an embodiment, a composition can comprise one or more carriers, useful excipients and/or diluents. In some embodiments, the composition comprises at least one of a $^{60}Cu$, $^{61}Cu$, or $^{64}Cu$ detectably labeled compound.

A pharmaceutical composition can comprise a (purified, if desired) tracer compound with an emitting radiolabel such as a copper nuclide and optionally a suitable adjuvant such as a surfactant which is pharmacologically acceptable to the patient such as to a living mammal such as a living human.

The pharmaceutical can comprise a water soluble salt of a tracer compound in an aqueous with an associated emitting radiolabel as well as a saline solution. High purity radiolabel and high activity radiolabel are preferred. The choice of tracer compound and radiolabel will be determined to an extent by the particular affliction being diagnosed, such as cancer.

The agents and compositions described herein can be formulated by any conventional manner using one or more pharmaceutically acceptable carriers or excipients as described in, for example, Remington's Pharmaceutical Sciences (A. R. Gennaro, Ed.), 21st edition, ISBN: 0781746736 (2005), incorporated herein by reference in its entirety. Such formulations will contain a therapeutically effective amount of a biologically active agent described herein, which can be in purified form, together with a suitable amount of carrier so as to provide the form for proper administration to the subject. In some embodiments, as used herein the term "patient" includes a human and a non-human such as feline, canine, horse and murine.

The term "formulation" refers to preparing a drug in a form suitable for administration to a subject, such as a human. Thus, a "formulation" can include pharmaceutically acceptable excipients, including diluents or carriers.

The term "pharmaceutically acceptable" as used herein can describe substances or components that do not cause unacceptable losses of pharmacological activity or unacceptable adverse side effects. Examples of pharmaceutically acceptable ingredients can be those having monographs in United States Pharmacopeia (USP 29) and National Formulary (NF 24), United States Pharmacopeial Convention, Inc, Rockville, Maryland, 2005 ("USP/NF"), or a more recent edition, and the components listed in the continuously updated Inactive Ingredient Search online database of the FDA. Other useful components that are not described in the USP/NF, etc. may also be used.

The term "pharmaceutically acceptable excipient," as used herein, can include any and all solvents, dispersion media, coatings, antibacterial and antifungal agents, isotonic, or absorption delaying agents. The use of such media and agents for pharmaceutical active substances is well known in the art (see generally Remington's Pharmaceutical Sciences (A. R. Gennaro, Ed.), 21st edition, ISBN: 0781746736 (2005)). Except insofar as any conventional media or agent is incompatible with an active ingredient, its use in the therapeutic compositions is contemplated. Supplementary active ingredients can also be incorporated into the compositions.

A "stable" formulation or composition can refer to a composition having sufficient stability to allow storage at a convenient temperature, such as between about 0° C. and about 60° C., for a commercially reasonable period of time, such as at least about one day, at least about one week, at least about one month, at least about three months, at least about six months, at least about one year, or at least about two years.

The formulation should suit the mode of administration. The agents of use with the current disclosure can be formulated by known methods for administration to a subject using several routes which include, but are not limited to, parenteral, pulmonary, oral, topical, intradermal, intramuscular, intraperitoneal, intravenous, subcutaneous, intranasal, epidural, ophthalmic, buccal, and rectal. The individual agents may also be administered in combination with one or more additional agents or together with other biologically active or biologically inert agents. Such biologically active or inert agents may be in fluid or mechanical communication with the agent(s) or attached to the agent(s) by ionic, covalent, Van der Waals, hydrophobic, hydrophilic or other physical forces.

Controlled-release (or sustained-release) preparations may be formulated to extend the activity of the agent(s) and reduce dosage frequency. Controlled-release preparations can also be used to effect the time of onset of action or other characteristics, such as blood levels of the agent, and consequently affect the occurrence of side effects. Controlled-release preparations may be designed to initially release an amount of an agent(s) that produces the desired therapeutic effect, and gradually and continually release other amounts of the agent to maintain the level of therapeutic effect over an extended period of time. In order to maintain a near-constant level of an agent in the body, the agent can be released from the dosage form at a rate that will replace the amount of agent being metabolized or excreted from the body. The controlled-release of an agent may be stimulated by various inducers, e.g., change in pH, change in temperature, enzymes, water, or other physiological conditions or molecules.

Agents or compositions described herein can also be used in combination with other therapeutic modalities, as described further below. Thus, in addition to the therapies described herein, one may also provide to the subject other therapies known to be efficacious for treatment of the disease, disorder, or condition.

Therapeutic Methods

Also provided is a process of treating cancer in a subject in need administration of a therapeutically effective amount of a radiopharmaceutical comprising a copper radioisotope, so as to increase the survival time of tumor-bearing subjects or reduce tumor burden. Recently there has been a renewed interest in Cu-64 as a therapeutic due to its relatively long half-life. For example, F-18 half-life is not long enough to bind to some receptors.

Methods described herein are generally performed on a subject in need thereof. A subject in need of the therapeutic methods described herein can be a subject having, diagnosed with, suspected of having, or at risk for developing cancer. A determination of the need for treatment will typically be assessed by a history and physical exam consistent with the disease or condition at issue. Diagnosis of the various conditions treatable by the methods described herein is within the skill of the art. The subject can be an animal subject, including a mammal, such as horses, cows, dogs, cats, sheep, pigs, mice, rats, monkeys, hamsters, guinea pigs, and chickens, and humans. For example, the subject can be a human subject.

Generally, a safe and effective amount of a radiopharmaceutical agent is, for example, that amount that would cause the desired therapeutic effect in a subject while minimizing undesired side effects. In various embodiments, an effective amount of a radiopharmaceutical agent described herein can substantially inhibit the growth of cancer, slow the progress of cancer, or limit the development of cancer.

According to the methods described herein, administration can be parenteral, pulmonary, oral, topical, intradermal, intramuscular, intraperitoneal, intravenous, subcutaneous, intranasal, epidural, ophthalmic, buccal, or rectal administration.

When used in the treatments described herein, a therapeutically effective amount of a radiopharmaceutical agent can be employed in pure form or, where such forms exist, in pharmaceutically acceptable salt form and with or without a pharmaceutically acceptable excipient. For example, the compounds of the present disclosure can be administered, at a reasonable benefit/risk ratio applicable to any medical treatment, in a sufficient amount to increase the survival time of tumor-bearing subjects, reduce tumor burden, substantially inhibit the growth of cancer, slow the progress of cancer, or limit the development of cancer.

The amount of a composition described herein that can be combined with a pharmaceutically acceptable carrier to produce a single dosage form will vary depending upon the host treated and the particular mode of administration. It will be appreciated by those skilled in the art that the unit content of agent contained in an individual dose of each dosage form need not in itself constitute a therapeutically effective amount, as the necessary therapeutically effective amount could be reached by administration of a number of individual doses.

Toxicity and therapeutic efficacy of compositions described herein can be determined by standard pharmaceutical procedures in cell cultures or experimental animals for determining the $LD_{50}$ (the dose lethal to 50% of the population) and the $ED_{50}$, (the dose therapeutically effective in 50% of the population). The dose ratio between toxic and therapeutic effects is the therapeutic index that can be expressed as the ratio $LD_{50}/ED_{50}$, where larger therapeutic indices are generally understood in the art to be optimal.

The specific therapeutically effective dose level for any particular subject will depend upon a variety of factors including the disorder being treated and the severity of the disorder; activity of the specific compound employed; the specific composition employed; the age, body weight, general health, sex and diet of the subject; the time of administration; the route of administration; the rate of excretion of the composition employed; the duration of the treatment; drugs used in combination or coincidental with the specific compound employed; and like factors well known in the medical arts (see e.g., Koda-Kimble et al. (2004) Applied Therapeutics: The Clinical Use of Drugs, Lippincott Williams & Wilkins, ISBN 0781748453; Winter (2003) Basic Clinical Pharmacokinetics, $4^{th}$ ed., Lippincott Williams & Wilkins, ISBN 0781741475; Shamel (2004) Applied Biopharmaceutics & Pharmacokinetics, McGraw-Hill/Appleton & Lange, ISBN 0071375503). For example, it is well within the skill of the art to start doses of the composition at levels lower than those required to achieve the desired therapeutic effect and to gradually increase the dosage until the desired effect is achieved. If desired, the effective daily dose may be divided into multiple doses for purposes of administration. Consequently, single dose compositions may contain such amounts or submultiples thereof to make up the daily dose. It will be understood, however, that the total daily usage of the compounds and compositions of the present disclosure will be decided by an attending physician within the scope of sound medical judgment.

Again, each of the states, diseases, disorders, and conditions, described herein, as well as others, can benefit from compositions and methods described herein. Generally, treating a state, disease, disorder, or condition includes preventing or delaying the appearance of clinical symptoms in a mammal that may be afflicted with or predisposed to the state, disease, disorder, or condition but does not yet experience or display clinical or subclinical symptoms thereof. Treating can also include inhibiting the state, disease, disorder, or condition, e.g., arresting or reducing the development of the disease or at least one clinical or subclinical symptom thereof. Furthermore, treating can include relieving the disease, e.g., causing regression of the state, disease, disorder, or condition or at least one of its clinical or subclinical symptoms. A benefit to a subject to be treated can be either statistically significant or at least perceptible to the subject or to a physician.

Administration of a radiopharmaceutical agent can occur as a single event or over a time course of treatment. For example, a radiopharmaceutical agent can be administered daily, weekly, bi-weekly, or monthly. For treatment of acute conditions, the time course of treatment will usually be at least several days. Certain conditions could extend treatment from several days to several weeks. For example, treatment could extend over one week, two weeks, or three weeks. For more chronic conditions, treatment could extend from several weeks to several months or even a year or more.

Treatment in accord with the methods described herein can be performed prior to, concurrent with, or after conventional treatment modalities for cancer.

Administration

As used herein, the term "administration" can include the successful administration of an individually highly purified $^{60}$Cu, $^{61}$Cu, or $^{64}$Cu labeled compound by any useful means to a living mammal and its successful introduction into the mammal internally such as by intravenous injection in an effective method which results in that compound, its salt, its ions, metabolites or derivatives being made biologically available to that mammal receiving administration of the highly purified $^{60}$Cu, $^{61}$Cu and $^{64}$Cu labeled compound for medicinal or therapeutic use. In some embodiments, the mammal is a living nonhuman mammal such as a canine, feline, rat, rodent, mouse or a living cell therefrom.

In an embodiment, the highly purified $^{60}$Cu, $^{61}$Cu, or $^{64}$Cu labeled compound can be made biologically available to the mammal patient. In some embodiments, the administration comprises giving of at least one of a highly purified $^{60}$Cu, $^{61}$Cu, or $^{64}$Cu detectably labeled compound. In some embodiments, the mammal is a human and the radionuclide is individually Copper-60 or Copper-61, or Copper-64.

As used herein, the term "dosage" can include that amount of automatically separated, recovered and purified $^{60}$Cu, $^{61}$Cu, or $^{64}$Cu compound which when effectively administered to a living mammal provides an effective amount of biologically available $^{60}$Cu, $^{61}$Cu, or $^{64}$Cu labeled compound to the living mammal to enable radioimage detection and acquisition via external radioimage detector or to enable a therapeutically effective response (e.g., reduction in tumor size, reduction in cancer cells, reduction in tumor/cancer burden).

In some embodiments, the term "tissue" includes mammalian body tissue of the mammal being administered the radiolabeled compound.

Agents and compositions described herein can be administered according to methods described herein in a variety of means known to the art.

As discussed above, administration can be parenteral, pulmonary, oral, topical, intradermal, intramuscular, intraperitoneal, intravenous, subcutaneous, intranasal, epidural, ophthalmic, buccal, or rectal administration.

Agents and compositions described herein can be administered in a variety of methods well known in the arts. Administration can include, for example, methods involving oral ingestion, direct injection (e.g., systemic or stereotactic), implantation of cells engineered to secrete the factor of interest, drug-releasing biomaterials, polymer matrices, gels, permeable membranes, osmotic systems, multilayer coatings, microparticles, implantable matrix devices, mini-osmotic pumps, implantable pumps, injectable gels and hydrogels, liposomes, micelles (e.g., up to 30 μm), nanospheres (e.g., less than 1 μm), microspheres (e.g., 1 μm-100 μm), reservoir devices, a combination of any of the above, or other suitable delivery vehicles to provide the desired release profile in varying proportions. Other methods of controlled-release delivery of agents or compositions will be known to the skilled artisan and are within the scope of the present disclosure.

Delivery systems may include, for example, an infusion pump which may be used to administer the agent or composition in a manner similar to that used for delivering insulin or chemotherapy to specific organs or tumors. Typically, using such a system, an agent or composition can be administered in combination with a biodegradable, biocompatible polymeric implant that releases the agent over a controlled period of time at a selected site. Examples of polymeric materials include polyanhydrides, polyorthoesters, polyglycolic acid, polylactic acid, polyethylene vinyl acetate, and copolymers and combinations thereof. In addition, a controlled release system can be placed in proximity of a therapeutic target, thus requiring only a fraction of a systemic dosage.

Agents can be encapsulated and administered in a variety of carrier delivery systems. Examples of carrier delivery systems include microspheres, hydrogels, polymeric implants, smart polymeric carriers, and liposomes (see generally, Uchegbu and Schatzlein, eds. (2006) Polymers in Drug Delivery, CRC, ISBN-10: 0849325331). Carrier-based systems for molecular or biomolecular agent delivery can: provide for intracellular delivery; tailor biomolecule/agent release rates; increase the proportion of biomolecule that reaches its site of action; improve the transport of the drug to its site of action; allow colocalized deposition with other agents or excipients; improve the stability of the agent in vivo; prolong the residence time of the agent at its site of action by reducing clearance; decrease the nonspecific delivery of the agent to nontarget tissues; decrease irritation caused by the agent; decrease toxicity due to high initial doses of the agent; alter the immunogenicity of the agent; decrease dosage frequency, improve taste of the product; or improve shelf life of the product.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Manufacturing Process of Cu-64

The manufacturing process of Cu-64 with high yield, specific activity, and purity, includes the target preparation by electroplating, bombardment with a proton beam having an energy of 14.25 MeV, and a specialized processing system developed at Washington University to produce Cu-64 chloride and recovery of the enriched Ni-64.

Parameters

Electroplating—the goal in this example was to achieve a thick target. Here, the disclosed process uses less than 80 mg of enriched Ni-64 to achieve a thick target.

Figure 3:
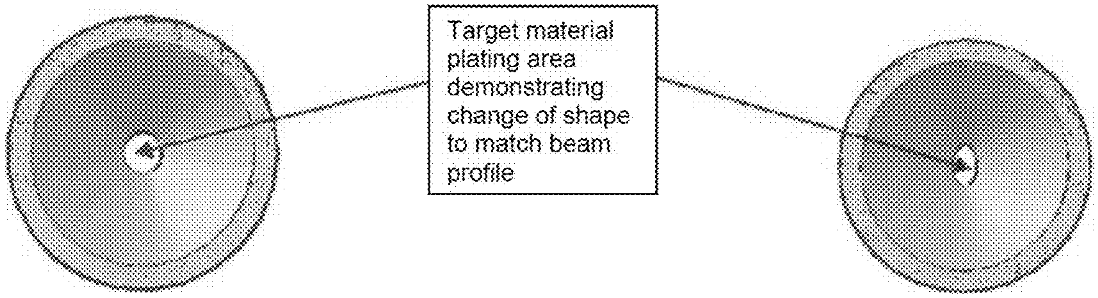
FIG. 3 is an illustration depicting the target material plating area.

To accomplish this, the target material plating area was limited to 20 $mm^2$. The plating area restriction typically requires modification to the proton beam shape of the cyclotron used to produce Cu-64 by focusing and constraining the proton beam prior to striking the target material. Reduction of the size of the plating area, (see e.g., FIG. 3), for example, using Ni-64 as the target can be accomplished by reducing the plating area by 20%, and increasing the target thickness by 25%, thus reducing the amount of Ni-64 needed to produce a thick target.

Reducing the amount of Ni-64 will significantly reduce cost and continue to improve specific activity. Improving the yield to material usage is established by reducing area, thus increasing the thickness of the target.

To accomplish this, the target material was limited to a plating area 20 $mm^2$. The plating area restriction required modification to the proton beam shape of the cyclotron used to produce Cu-64 by constraining the proton beam prior to striking the target material.

Reducing the plating area improved the process. The disclosed design focuses on shaping the plating area to match the beam spot. To accomplish this, target holders were slightly redesigned to insure the orientation of the plated Ni-64. Other plating parameters metals and chemicals used and power inputs are well defined. Metals are nickel-plated routinely for appearance.

Visual Analysis of Ni-64 Target Prior to Bombardment

Microscopic analysis of the electroplated Ni-64 target material has eliminated unexpected vaporized target and aids in predicting target saturation yields based on irregularities in the plating surface that can occur.

Target holders align the Ni-64 target material in beam and provide front and back face cooling that allows for increased beam currents and yields. Target holders used in these experiments are both ACSI and Washington University designed target holders. Both target holders were adapted to Cu-64 production, by adding a dedicated deionized cooling water system to the target holder. This removed the ACSI target holder from the cyclotron chilled water system as it was designed. Additionally, the water connections to the target holder and valves used to control deionized water flow were also replaced to be compatible with deionized water having a resistivity of MO. The dedicated chilled water system for the Washington University designed target was installed to prevent radioisotope contamination of the chilled water system of the cyclotron and reduce copper contamination. The specific activity of the Cu-64 chloride and the quality of recovered Ni-64 were improved when the deionized water, the target material holder came into contact with, was significantly improved from 2 MΩ to ≥7.5 MΩ. To maintain the high quality water, the deionization cartridge type was changed to eliminate both cations and anions, to insure ≥7.5 MΩ quality water. These steps were taken to limit contamination of the Cu-64 chloride.

Improved specific activity of Cu-64 and quality of recovered Ni-64 was obtained by reducing potential for metal contaminants by eliminating parts that were not deionized water compatible. We also changed the deionization cartridge type to eliminate both cations and anions to insure ≥7.5 MΩ quality water. These steps are intended to reduce Cu, Ni, Fe, Zn, and/or Co contamination or keep Cu, Ni, Fe, Zn, and/or Co contamination to a minimum.

The improved target holder specifically aided the objective of reducing the plating area of target material to match beam spot includes a key method, allowing bombardment of non-symmetrical targets.

Specialized Processing

The Cu-64 separation module was constructed from HCl resistant materials where possible—special attention was paid to avoid iron and zinc based materials. When unavoidable the components made of stainless steel were coated with Teflon™ materials.

Dissolution of Ni-64 containing Cu-64 with 6 N HCl occurred in a gated Teflon™ dissolution vessel (any plastic that is HCl and heat resistant to 260° C. would be suitable) closed during heating. The Teflon™ gate valve allows for hands free target addition and contains hot acid under pressure without contaminating the Cu-64 chloride.

Separation of Ni-64 and Cu-64 was performed by controlled liquid chromatography this step optimizes both the recovery of the Ni-64 and purity of the Cu-64 chloride.

The Cu-64 separation module design (see e.g., FIG. 1A-FIG. 1D), improved previous versions and was optimized to address issues experienced using the manual remote system. The latest design uses vacuum, pressure, and syringe drives to affect the flow of chemicals through the system and enables the standardization of the Ni-64 recovery and Cu-64 chloride yield. It is believed that the disclosed system is the first system to use all of the above methods for moving liquids through the automation system. While a single method could be used to effect movement of liquids, using all three for specific tasks have enabled improved reliability and % radiochemical yields.

The dissolution vessel was modified to improve reliability and eliminate the need to orient the target holder for optimal dissolution of the Ni-64 containing Cu-64 from the gold disk. The reflux condenser on past version of the Cu-64 separation model intended to contain HCl vapor during heating was removed in favor of an in house developed Teflon™ gate valve that allow the generation of pressure within the digestion vessel. This has proven more effective at containing the HCl acid vapor than the water-cooled reflux condenser and decreased the difficulty of installing the module in a standard hot cell.

The Teflon™ digestion vessel is contained in aluminum housing that is heated to 125-140° C. during digestion and has cooling fin to allow for rapid cooling of the digestion vessel and contents. This allows the contents of the digestion vessel to be move to ion exchange column with shorter cool down periods. Additionally the bottom is conical, having a Teflon™ spacer added to the vessel to eliminate the need to orient the target and prevents blockage of the fluid pathway by the gold disk substrate. The flow pathways were optimized for precise fluid flow and easy replacement of chemical traps intended to contain acid vapor and Cu-64 in the unlikely event it aerosolized. Appropriate cleaning of the automated separation module was simplified with dedicated fluid pathways and proved more effective at maintaining high specific activity of the product than disposable tubing, believed to be the result of small dead volume using non-disposable fluid pathways versus disposable.

The dissolution vessel was designed allow for automatic delivery of the target from the cyclotron using dedicated carriers transported from the cyclotron vault to the hot cell using vacuum. Once in the hot cell, the carrier is automatically opened to drop the target in the dissolution vessel that is then closed by the gate valve to begin the process of separating the Cu-64 from the gold disk target holder. The carrier is then returned to the cyclotron vault when needed to automatically collect the next Cu-64 target. The solid target transfer system was designed with specialized station in the hot cell module that allows the target to be added into the dissolution vessel from a specialized carrier automatically and returned the cyclotron vault target drop.

The Cu-64 chloride produced is eluted in 0.5 M HCl, to be useful in labeling, the 0.5 M HCl Cu-64 Chloride is evaporated to dryness using trapping systems to neutralize the 0.5 M HCl. It is then reconstituted in microliter amounts of 0.1 M HCl with the quantity of 0.1 M HCl determined by need concentrations.

Improved Process

Of the important steps in producing high purity and specific activity radionuclides with proton irradiations, one of the more complicated to achieve is limiting the amount of target material needed to produce thick target yields for the planned proton energy bombardment. This was accomplished by degrading the energy of the beam to below 14.5 MeV and focusing of the proton beam. Performing this step usually results in an asymmetric shaped beam strike. As a result, the asymmetric beam shape using a typical or conventional target and target holder system requires more target material than is necessary to reliably produce radionuclides in high yields. This unnecessary target material can increase the cost to produce a radioisotope and negatively impact the specific activity.

There are numerous methodologies for determining the size, shape, and intensity of a proton beam produced by a particle accelerator. The present invention describes a method that allows for further minimization of the target material needed, in the present case, Ni-64 to produce Cu-64 once the beam shape has been determined.

Figure 4:
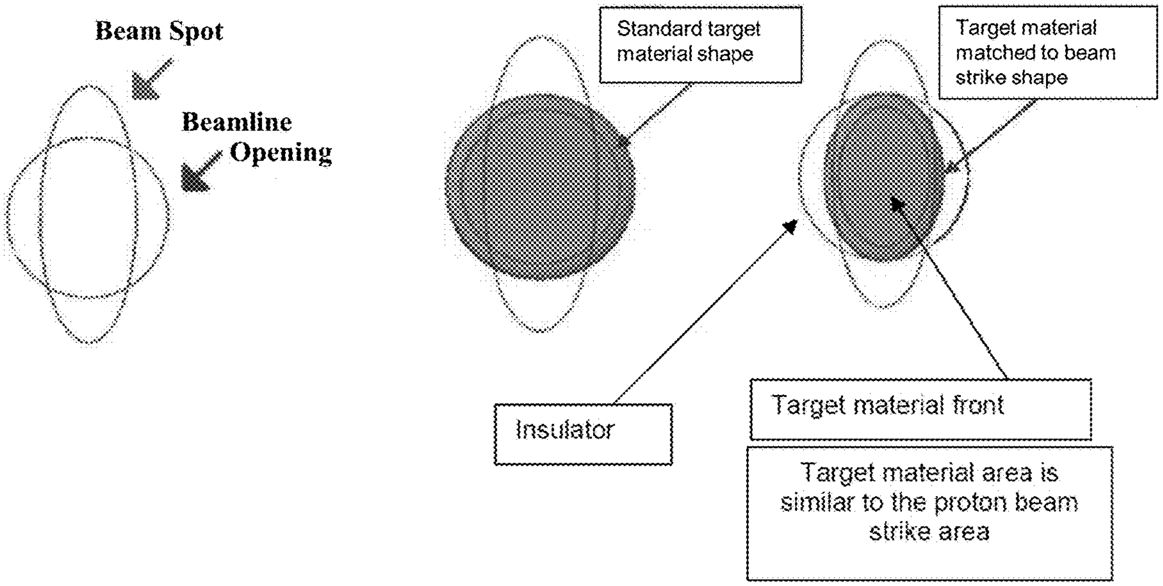
FIG. 4 is an illustration describing the method that allows for minimization of the target material needed, in this case Ni-64, to produce Cu-64 once the beam shape has been determined.
Figure 5:
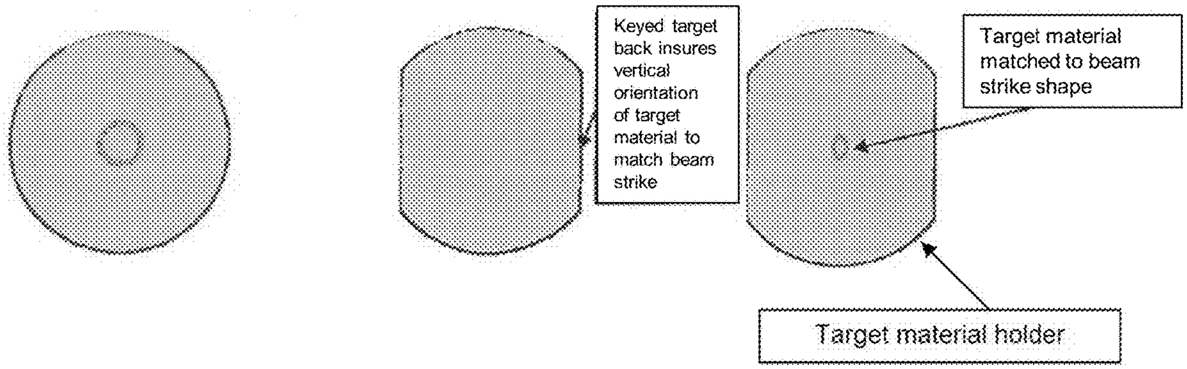
FIG. 5 is an illustration depicting the target back is keyed to assure the orientation of the target material with the beam spot.
Figure 6:
FIG. 6 is an illustration for an insulated target material holder mounting flange to the beamline insures accurate beam current measurements on the target back and material and allows for better beam steering.

As part of the electroplating process, an insulator was applied on the target back to be plated with the target material made of gold or platinum that allowed for shaping of the target material to closely match the area of the beam strike area (see e.g., FIG. 4). For example, if the beam spot is an elongated oval, and the beamline opening is a circle, the improved target shape would be an oval that is approximately the size of the overlapping beamline opening and beamspot, such as an oval (see e.g., FIG. 4). The target back was keyed to assure the orientation of the target material with the beam spot (see e.g., FIG. 5). The target holder is a specialized system that holds the target back and material in the beam strike area of the proton accelerator and provides cooling necessary to dissipate the heat from the bombardment. Additionally the target holder system is designed to clear or remove the cooling water, drying the target back in the process. The target holder is designed to accept the keyed target back that provides for the target material to be orientated to the beam strike. An insulated target holder mounting flange to the beamline insures accurate beam current measurements on the target back and target material and allows for better beam steering (see e.g., FIG. 6).

The full implementation of this process reduced the amount of target material needed to produce Cu-64 in high yield of ≥7.5 Ci at saturation, reliably producing ≥150 mCi/μA with the specific activity expected to routinely exceed 300 mCi/μg (see e.g., TABLE 1).

TABLE 1

Specific activities obtained using various methods

| Previous Methods | | Transistioning Methods | | Patent Application Method (Partial) | |
|---|---|---|---|---|---|
| Date | mCi/μg | Date | mCi/μg | Date | mCi/μg |
| Jan. 3, 2012 | 44 | Jan. 7, 2014 | 138 | Jan. 3, 2018 | 354 |
| Jan. 10, 2012 | 181 | Jan. 14, 2014 | 172 | Jan. 9, 2018 | 240 |
| Jan. 12, 2012 | 88 | Jan. 21, 2014 | 158 | Jan. 16, 2018 | 375 |
| Jan. 17, 2012 | 167 | Jan. 28, 2014 | 271 | Jan. 23, 2018 | 619 |
| Jan. 31, 2012 | 290 | Feb. 4, 2014 | 115 | Jan. 30, 2018 | 859 |
| Feb. 7, 2012 | 161 | Feb. 11, 2014 | 430 | Feb. 6, 2018 | 885 |
| Feb. 14, 2012 | 77 | Feb. 18, 2014 | 226 | Feb. 13, 2018 | 702 |
| Feb. 21, 2012 | 239 | Mar. 6, 2014 | 219 | Feb. 15, 2018 | 479 |
| Feb. 28, 2012 | 219 | Mar. 11, 2014 | 397 | Feb. 20, 2018 | 648 |
| Mar. 6, 2012 | 110 | Mar. 18, 2014 | 286 | Feb. 22, 2018 | 465 |
| Mar. 8, 2012 | 17 | Mar. 25, 2014 | 293 | Feb. 27, 2019 | 349 |
| Mar. 20, 2012 | 30 | Apr. 1, 2014 | 230 | Mar. 1, 2018 | 308 |
| Mar. 27, 2012 | 36 | Apr. 3, 2014 | 145 | Mar. 3, 2018 | 335 |
| Average | 128 | Average | 237 | Average | 509 |

What is claimed is:

1. A method for manufacturing a radioisotope with improved specific activity comprising:
- providing a target material comprising a Ni isotope;
- providing a target material holder;
- providing a proton beam comprising a proton beam energy and a proton beam strike area;
- providing a material holder mounting flange capable of measuring a proton beam current of the target material for beam steering; and
- introducing the proton beam to the target material, resulting in a composition comprising a Cu radioisotope;
- wherein,
  - the target material comprises a target material area; and
  - the target material area matches the proton beam strike area, resulting in matching of the target material and the proton beam.

2. The method of claim 1, comprising degrading or reducing the proton beam energy to below 14.5 meV and focusing or constraining the proton beam.

3. The method of claim 1, wherein
- the target material comprises Ni-64;
- the target material has a weight of 80 mg or less;
- the target material area is 20 $mm^2$ or less; and
- the proton beam strike area or the target material area is not a circle, is asymmetric, or is approximately an oval.

4. The method of claim 1, wherein the proton beam strike area is constrained to match the target material or the target material is modified to match the proton beam strike area.

5. The method of claim 1, wherein the target material is mounted to the target material holder via an insulator.

6. The method of claim 5, wherein the target material comprises gold or platinum.

7. The method of claim 1, wherein
- the target material holder is designed to accept a keyed target material; and
- the target material holder orients the target material in the proton beam strike area of the proton beam.

8. The method of claim 1, wherein the target material holder provides cooling or dissipates heat produced by the proton beam.

9. The method of claim 1, wherein the target material holder provides cooling water and removes the cooling water.

10. The method of claim 9, wherein the cooling water is deionized, having a resistivity of 7.5 MΩ or greater than about 7.5 MΩ, preventing or reducing radioisotope contamination of the cooling water.

11. The method of claim 1, further comprising recovering the target material.

12. The method of claim 1, wherein a reduced amount of the target material is required to produce Cu-64 of at least 7.5 Ci at saturation compared to an amount of the target material required if the proton beam strike area does not match the target material area.

13. The method of claim 1, wherein the Cu radioisotope has an activity of at least 150 mCi/μA.

14. The method of claim 1, wherein the Cu radioisotope has a specific activity of at least 200 mCi/μg, at least 250 mCi/μg, or at least 300 mCi/μg.

15. The method of claim 1, further comprising contacting the composition comprising the Cu radioisotope with an acid.

16. The method of claim 15, wherein the acid is hydrochloric acid (HCl).

17. The method of claim 15, wherein the composition comprising the Cu radioisotope is a mixture comprising the Ni isotope and the Cu radioisotope.

18. The method of claim 17, further comprising separating the Ni isotope and the Cu radioisotope using liquid chromatography.

* * * * *